July 26, 1932.  G. REINHARDT  1,869,117
SECTIONAL TIRE CASING
Filed March 13, 1931
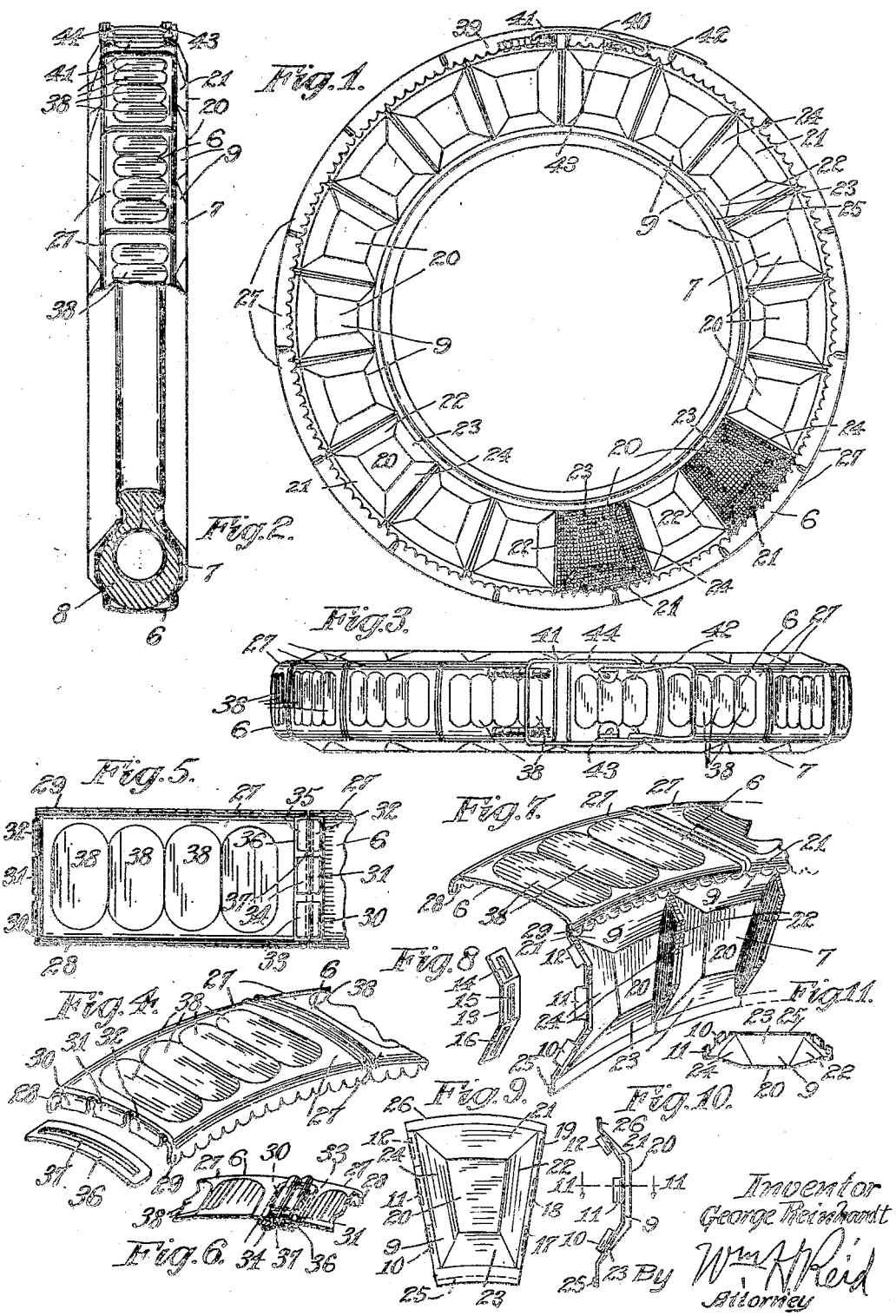

Patented July 26, 1932

1,869,117

UNITED STATES PATENT OFFICE

GEORGE REINHARDT, OF PLEASANT PLAINS, STATEN ISLAND, NEW YORK

SECTIONAL TIRE CASING

Application filed March 13, 1931. Serial No. 522,287.

This invention relates to casings or covers for the spare tire, or the tire and rim, or even the tire and wheel, that are usually carried on some part of the automobile, such as the running board, or sometimes mounted on the rear in a suitable bracket or support.

The object of the present invention is to provide a device of this character that is composed of a side ring and a tread band, with fastening means for the meeting ends of the tread band, one or both of which are formed of a series of comparatively small sections, permanently secured together, with the side ring preferably continuous, and the tread band in the form of a strip.

A further object of the invention is to provide a device of this character in which the sections of the side ring are an even number, such as about 16 or 18, and the alternate ones are decorated the same, but adjoining ones different; for instance one alternate set can be of polished metal such as chromium plated, and the other alternate plates are enameled in any desired color, such as the color in which the automobile is finished.

In the accompanying drawing showing one embodiment of my invention;

Figure 1 is a side elevation.

Fig. 2 is an end elevation partly in section

Fig. 3 is a plan view.

Fig. 4 shows enlarged the sections of the tread band.

Fig. 5 shows the inner face of the tread plates.

Fig. 6 is a detail of the fastening means for these sections.

Fig. 7 is a section enlarged through the device.

Fig. 8 shows one of the holding strips.

Fig. 9 is a plan view of one of the ring sections.

Fig. 10 is a side elevation of the latter.

Fig. 11 is a section on the line 11—11 of Fig. 10.

As shown in the drawing the device comprises a tread band denoted generally by 6, and a side ring 7, that are adapted to engage the tire shoe 8 at the tread and side portions respectively. The side ring is composed of an annular series of sections, in the form of plates 9, that as shown, are somewhat keystone in outline, see Fig. 9. Each of these plates is provided on the two side edges, that adjoin when they are brought together to form a continuous ring, with flanges, three of which, 10, 11, and 12, are shown on each side. These flanges are adapted to engage a metal strip 13, provided with slots 14, 15 and 16, into which the said flanges are inserted, respectively. The opposite edge of the plate 9 is provided with similar flanges 17, 18 and 19, and the two plates are brought together and each of the three slots receives the adjacent flanges from the two plates, which flanges are bent backwardly on the strip, as indicated in Fig. 5, thus securing the adjacent edges of the plates together. This is done all round the member to form a continuous ring as shown in Fig. 1. Since the purpose of this ring is to engage the side wall of the shoe or tire, it must be somewhat concave on the inner wall, and as shown each plate is somewhat of a pyramid form, with a center flat portion 20 and four converging portions 21, 22, 23, and 24. At the inner edge beyond the face 23 is a flat edge 25 bent up in the form of a bead to strengthen this portion and obviate a raw metal edge. I also form a flat band 26 at the upper edge, to be engaged by the tread member.

The tread band 6 is also composed of an annular series of comparatively small plates 27, that have on each side flanges 28 and 29, that extend downwardly or inwardly, and which may be scolloped on the edges as shown. These plates 27 are secured together in the series but not to form a continuous ring, the ends being loose and provided with attaching means to draw them together around the tread of the tire. These plates 27 are provided with interlocking ends somewhat similar to that of the side ring plates. As shown in Fig. 4 I provide flanges 30, 31, and 32 on one end of the plate 27 and similar flanges 33, 34, and 35 on the opposite end. The adjacent ends of each pair of plates are brought together and the flanges inserted in a strip 36 having a middle slot 37, and thereupon the flanges are bent back on this plate, as shown in Figs. 5 and 6 to secure the plates together into a single long strip, or an open end band. Each of these plates is convex on its outer face corresponding to the usual tread face of a tire, and is provided with a number of flat faces 38.

Means are also provided for drawing together and securing the two end plates 39 and 40 of the tread band that may be in the form of a wire bail 41 hinged to a loop handle 42 which bail engages bent up ears 43 and 44 in the end plate 40.

In the use of the device the side ring 7 is first placed in position, and then the tread band applied to have its side flange engage the flange portion 26 of each of the ring plates, as indicated in Fig. 7. The securing means, such as the wire bail or other device is then operated to lock the tread band on the tread face of the tire, that will obviously secure the side ring in place. It will be apparent that this side ring can be duplicated on the opposite side of the tire, as shown in Fig. 2, each side ring being engaged by one of the side flanges of the tread member plates.

It will be understood that a device of this character permits special ornamentation or decorative effect. For instance where the side ring is composed of an even number of plates, such as the 18 plates shown, one half of these can be decorated the same that alternate respectively with the other half of these plates. For instance nine of the plates can be finished in polished metal such as chromium or nickel and the other nine plates can be enameled in the same color that might correspond with the color of the automobile on which it is used. The tread plates are preferably of a bright metal finish, but could be of any desired enameled color. It will be seen that the members formed as set forth are much cheaper to manufacture, as the plates are identical and one set of blanking and forming dies will produce all of the side plates, and the same applies to the tread plates. The assembling of these with the slotted strips is a very simple matter very quickly attended to.

What I claim is:—

1. A tire casing comprising a comparitively flat side ring, and a tread band with free ends arranged to enclose the tread face of the tire, adjustable securing means entirely carried by said band ends to draw them together and secure the band on the tire with the side ring confined by the engaged margins of the band and ring, the side ring being composed of an annular series of plates each of substantially keystone outline, each plate having on the sides that are relatively adjoining a flange bent back on the inner face of the plate, and a metal strip provided with a middle slot into which both of the flanges of adjoining plates are inserted to secure these plates together in a continuous ring.

2. A tire casing comprising a comparitively flat side ring, and a tread band with free ends arranged to enclose the tread face of the tire, said tread band being composed of an annular series of plates, each plate being provided on relatively adjoining sides with a flange bent back on the inner face of the plate, and a metal strip provided with a middle slot into which the flanges of adjoining plates are inserted to secure these plates together to form a continuous strip, and adjustable securing means carried by the two end plates of the said band to draw the ends of the band together to secure the band on the tire with the side ring confined by the engaged margins of the band and ring.

3. In a tire casing, an annular tire covering member consisting of an annular series of plates, the plates being provided on their adjacent ends with flanges bent back on the inner faces of said plates, and connecting strips each provided with a slot receiving the flanges of adjacent ends of adjacent plates to secure said plates together.

4. In a tire casing, an annular tire covering member consisting of an annular series of plates, the plates being provided on their adjacent ends with flanges bent back on the inner faces of said plates, and connecting strips each provided with a slot receiving the flanges of adjacent ends of adjacent plates to secure said plates together, said flanges being rebent to lie parallel to the plates, and form hooks for said strips.

Signed at New York city, N. Y., on March 5, 1931.

GEORGE REINHARDT.